US008606217B2

(12) United States Patent
Gut et al.

(10) Patent No.: US 8,606,217 B2
(45) Date of Patent: Dec. 10, 2013

(54) COMMUNICATION CONTROL SYSTEM AND METHOD FOR PERFORMING A TRANSMISSION OF DATA

(75) Inventors: Michael Gut, Bräunlingen (DE); Patrik Helbig, Donaueschingen (DE); Ulrich Münch, Dauchingen (DE)

(73) Assignee: Continental Automotive GmbH, Hannover (DE)

( * ) Notice: Subject to any disclaimer, the term of this patent is extended or adjusted under 35 U.S.C. 154(b) by 305 days.

(21) Appl. No.: 12/808,524

(22) PCT Filed: Dec. 17, 2008

(86) PCT No.: PCT/EP2008/067769
§ 371 (c)(1), (2), (4) Date: Jun. 16, 2010

(87) PCT Pub. No.: WO2009/080658
PCT Pub. Date: Jul. 2, 2009

(65) Prior Publication Data
US 2010/0273476 A1 Oct. 28, 2010

(30) Foreign Application Priority Data
Dec. 21, 2007 (DE) ........................ 10 2007 062 960

(51) Int. Cl.
*H04B 1/06* (2006.01)
*H04B 1/034* (2006.01)
*G06F 7/00* (2006.01)

(52) U.S. Cl.
USPC ....... 455/345; 455/99; 455/552.1; 455/553.1; 701/36; 701/29.1

(58) Field of Classification Search
USPC ............ 455/99, 345; 340/438, 425.5; 701/36, 701/29.1
See application file for complete search history.

(56) References Cited

U.S. PATENT DOCUMENTS 4,188,618 A * 2/1980 Weisbart .................. 340/870.16
6,141,610 A * 10/2000 Rothert et al. ............... 701/33.4
(Continued)

FOREIGN PATENT DOCUMENTS

CN 2718683 Y 8/2005
DE 10 2006 048 029 A1 4/2008
(Continued)

OTHER PUBLICATIONS

Siemens Aktiengesellschaft; Siemens VDO Automotive; "Digitaler Tachograph—Betriebsanleitung, Unternehmer & Fahrer—DTCO 1381, Rel. 1.2"; Jun. 2006; cover sheet, p. 14 and another sheet; BA00.1381.00 111 101—OPM 000 AA; Villingen-Schwenningen; Germany.

(Continued)

*Primary Examiner* — Wesley Kim
(74) *Attorney, Agent, or Firm* — Cozen O'Connor

(57) ABSTRACT

A communication control unit for transmitting data via a transmission pathway between a tachograph and a data processing facility. The transmission pathway contains at least one partial section for a wireless transmission. The communication control unit comprises a GSM module and/or a module for wireless data transmission with the data processing device. A system, which additionally contains a tachograph and a data processing facility. The tachograph and a communication control unit associated therewith are disposed in a vehicle and said data processing facility is disposed outside said vehicle. Using the communication control unit, a method for transmitting data via a transmission pathway between a tachograph and a data processing facility is also disclosed.

16 Claims, 4 Drawing Sheets

(56) References Cited

U.S. PATENT DOCUMENTS

| | | | | |
|---|---|---|---|---|
| 6,198,996 | B1 * | 3/2001 | Berstis | 701/36 |
| 7,912,641 | B2 * | 3/2011 | Osentoski et al. | 701/29.3 |
| 2001/0045451 | A1 * | 11/2001 | Tan et al. | 235/375 |
| 2003/0109972 | A1 * | 6/2003 | Tak | 701/29 |
| 2003/0139941 | A1 * | 7/2003 | Matsumoto | 705/1 |
| 2004/0064336 | A1 | 4/2004 | Muramatsu et al. | |
| 2005/0107930 | A1 * | 5/2005 | Park | 701/35 |
| 2006/0064336 | A1 * | 3/2006 | Cereseto et al. | 705/7 |
| 2007/0038342 | A1 | 2/2007 | Grana et al. | |
| 2007/0161355 | A1 * | 7/2007 | Zeng | 455/99 |
| 2007/0294033 | A1 | 12/2007 | Osentoski et al. | |
| 2008/0059701 | A1 | 3/2008 | Esfandabadi | |
| 2008/0176537 | A1 * | 7/2008 | Smoyer et al. | 455/414.1 |
| 2010/0004813 | A1 | 1/2010 | Lindinger et al. | |

FOREIGN PATENT DOCUMENTS

| | | |
|---|---|---|
| EP | 1 783 693 | 5/2007 |
| WO | WO 2006/000507 | 1/2006 |

OTHER PUBLICATIONS

Iveco press office: "Working for future remote downloading of data from Digital Tachograph"; Sep. 18, 2006; Torino; Italy; to be downloaded under website: http://www.iveco.com/IVECO—COM/.

* cited by examiner

COMMUNICATION CONTROL SYSTEM AND METHOD FOR PERFORMING A TRANSMISSION OF DATA

PRIORITY CLAIM

This is a U.S. national stage of Application No. PCT/EP2008/067769, filed on Dec. 17, 2008, which claims priority to German Application No: 10 2007 062 960.7, filed: Dec. 21, 2007, the contents of which are incorporated herein by reference.

BACKGROUND OF THE INVENTION

1. Field of the Invention

The invention relates to a communication controller for transmission of data via a transmission path between a tachograph and a data processing apparatus, a system for the transmission of data via a transmission path between a tachograph and a data processing installation that comprises such a communication controller, and a method for the transmission of data via a transmission path between at least one tachograph arranged in a vehicle and a data processing installation which is at a distance from the vehicle.

2. Related Art

Motor vehicles, particularly commercial vehicles, are often equipped with a tachograph to record, inter alia, the driving and rest periods for both the commercial vehicle and the drivers involved.

The data and further data stored and recorded in the tachograph firstly needs to be noted and archived in a defined time window in line with legal regulations. Secondly, it is important to have an overview of the data to be able to make good and reasonable use of a fleet comprising a plurality of motor vehicles or commercial vehicles.

To simplify the transmission of data from a tachograph to a haulage company, WO 2006/000507 A1 discloses a method in which the data from the tachograph is downloaded onto a data storage medium, the download being able to be effected by cable or wirelessly. Subsequently, the data is made available manually to a computer which is usually with the operator of the motor vehicle or commercial vehicle.

A drawback of the method disclosed therein is that authentication of the authorization to download the data requires what is known as a company card to be arranged in the tachograph. By the company card, the tachograph recognizes that the data to be downloaded onto the data storage medium is actually being downloaded by an authorized person.

SUMMARY OF THE INVENTION

It is an object of the invention to specify an article and a method of the type mentioned at the outset which afford simpler data transmission between a data processing installation and a tachograph.

By virtue of the communication controller for the transmission of data via a transmission path between a tachograph and a data processing installation having a GSM or UMTS module and/or a module for wireless data transmission—for example an IEEE-801.x standard—the communication controller can use standardized protocols to broker communication between the tachograph and the data processing installation. In addition, it is also possible to use other wireless transmission standards, such as Bluetooth, Wireless USB, radio waves, infrared waves. This is of great advantage, since this allows automated communication between the data processing installation and the tachograph without the need for manual transmission steps. In this case, the communication controller may have one of the above two modules or two modules. There may also be more than two modules if the communication controller should be able to communicate in more than two transmission standards.

The communication controller according to one embodiment of the invention is particularly well suited for use in conjunction with a digital tachograph. Accordingly, the subsequently cited developments and exemplary embodiments of a tachograph should also be understood to mean a digital tachograph.

The communication controller is arranged in the vehicle and is connected to the tachograph. In this case, the communication controller may be in the form of an independent appliance which is merely connected to the tachograph, or may be present as a solution implemented internally in the tachograph. When the communication controller is in the form of an independent appliance, the tachograph could remain almost unchanged in design and it would merely be possible to use already available interfaces for the communication between the communication controller and the tachograph. This is of particular benefit to users who are not yet willing or able to equip their motor vehicle or commercial vehicle fleet with tachographs in which a communication controller is integrated.

An advantage of the communication controller and the communication brokered by the communication controller between a tachograph and a data processing installation is that the authentication is highly simplified. The communication controller allows an apparatus for authentication, such as a company card, to remain in the company itself. The authentication is performed as data transmission using the standardized protocols, as are implemented in the GSM module or in the module for wireless data transmission.

In addition, the communication controller can act as a buffer store for the transmission of data between the data processing installation and the tachograph. In this way, neither the data processing installation nor the tachograph continues to be blocked with requests from the data processing installation or from the tachograph after the data have been downloaded, which means that the power consumption, the memory usage and the computation time usage in these appliances are reduced.

Advantageously, the communication controller has a control unit, a connecting interface to the tachograph and a power supply interface. The dedicated control unit can provide for communication between the tachograph and the data processing installation to be set up. The connecting interface to the tachograph allows standardized interfaces to different tachographs to be provided and makes use of already available assemblies. A similar situation applies for the power supply interface, which allows the communication controller to be supplied with power either by battery or by car battery or by the tachograph power supply. A combination of such power supplies is also conceivable for the communication controller.

It is likewise advantageous if the communication controller has a wire-based interface, such as a serial interface with a USB standard or other similar interface, in addition to the opportunities for wireless communication. Said interface can be used to transmit the data which is to be transmitted via the subsection for wireless transmission from the communication controller to the data processing installation in wire-based fashion or using a USB stick, if wireless communication between the communication controller and the data processing installation is not possible for any reason.

The communication controller is advantageously used in a system for the transmission of data via a transmission path between a tachograph and a data processing installation. In this case, the system has at least one tachograph, arranged in a vehicle, and a data processing installation arranged outside of the vehicle. The advantage of such a system is that the data no longer needs to be interchanged manually between the tachograph and the data processing installation. The communication controller, which sets up the connection between the tachograph and the data processing installation using the GSM module or the module for wireless data transmission, can be used to automate the download of data from the tachograph and to subsequently archive them in the data processing installation. This can be done during ongoing operation of the vehicle, i.e. the vehicle no longer needs to be in a workshop or an installation associated with the operator of the vehicle. This also prevents either the operating personnel or the operator or the driver of the vehicle from being able to forget or manipulate the download and archiving of the data. This essentially helps to simplify fleet management, particularly of a large number of vehicles, and thus saves costs.

Based on the automated download, it is possible for the data to be both archived and evaluated in the data processing installation.

It is particularly advantageous if the data processing installation has at least one server, a client and a communication interface for wireless data transmission with the communication controller. The data downloaded from the at least one tachograph by the communication controller is introduced into the data processing installation via the communication interface of the latter. In this case, the communication interface may be a WLAN access point (or access point for one of the aforementioned wireless transmission standards) or the connection between a GSM provider and a computer center. The server is used both to evaluate and to archive the transmitted data. The instructions for subsequent communication with the at least one tachograph which are obtained on the basis of the known data can also be stored and controlled by a server.

Mobile terminals, fixed computers or web interfaces can act as a client. The employees working in the control center can use the fixed computers or mobile terminals to maintain the software for the evaluation and archiving or to view and edit the transmitted data or to further process the date. The possibility of viewing the data via a web interface is also advantageous. In this way, employees can access the data from any locations via the internet.

The data processing installation may have an associated authentication apparatus. During an authentication process, the server transmits authentication data for the relevant authentication apparatus (there may be either just one or else a plurality of company cards available) and the data is forwarded to the communication controller and via the communication controller to the tachograph, so that the authentication apparatus of the company no longer needs to be introduced directly into the tachograph.

It is particularly advantageous if the system has a plurality of tachographs and communication controllers associated with the tachographs. In this way, the data from a plurality of vehicles and drivers can be automatically downloaded by a single data processing installation and at arbitrary or stipulated times.

The method for the transmission of data via a transmission path by at least one tachograph and a communication controller, associated with said tachograph, having a GSM module and/or a module for wireless data transmission combines the automated processes with an inventive system. The registration of the at least one communication controller notifies the data processing installation of the fact that the at least one tachograph is in the reception area of the network accesses associated with the data processing installation. Next, the data processing installation transmits an instruction for the transmission of selected data from the at least one tachograph or from the communication controller between the at least one tachograph or the communication controller and the data processing installation. Following authentication between data processing installation and tachograph, the data is transmitted from the tachograph to the communication controller and from the communication controller to the data processing installation.

Specific data understood to be, inter alia, data which has been collected in the course of the operation of the tachograph, such as rest and running periods for the vehicle and/or for the driver of the vehicle, distances, positions, fuel consumption and the like. What specific data needs to be transmitted to the data processing installation is defined by the instruction from the data processing installation.

It is particularly advantageous if the data transmitted between the at least one tachograph and the data processing installation is buffer-stored in the communication controller. When the data has been downloaded from the tachograph into the communication controller, no further activity by the tachograph is needed to download the data from the communication controller.

The connection between the communication controller and the data processing installation can be set up again by the communication controller at stipulated intervals or when driving through a reception range for a communication access associated with the data processing installation, whether for the purpose of transmitting the buffer-stored data or merely in order to check whether data needs to be transmitted.

In this context, it is particularly advantageous if the data processing installation has information about the at least one tachograph, where any information comprises at least one time and an instruction to be performed at the time. Said instruction may be either standard requests or requests to the tachograph by a data processing installation which arise on the basis of the already archived information.

This method is particularly advantageous if a plurality of vehicles with a multiplicity of tachographs and associated communication controllers can be connected to the data processing installation, wherein the data processing installation can communicate with the individual tachographs via the communication controllers associated with the respective tachographs independently of one another.

Further advantageous developments are disclosed in the further subordinate claims and the exemplary embodiments.

BRIEF DESCRIPTION OF DRAWINGS

The invention will be explained in more detail below with reference to a few exemplary embodiments. In the figures.

DETAILED DESCRIPTION OF THE DRAWINGS

Figure 1:
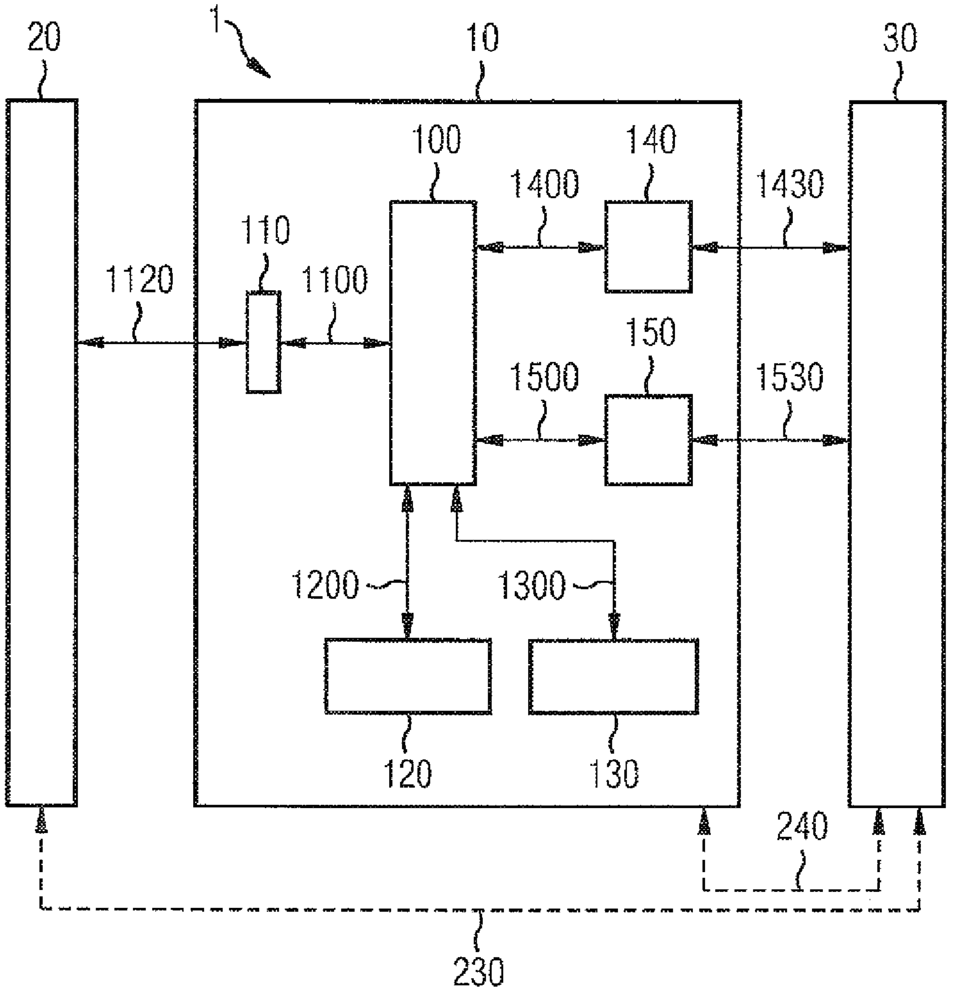
FIG. 1 is a schematic diagram of a system with a communication controller in one possible embodiment.

FIG. 1 is a schematic illustration of the system 1 according to the invention.

The system 1 has at least one communication controller 10, a tachograph 20 and a data processing installation 30. Information or data is/are intended to be interchanged between the tachograph 20 and the data processing installation 30 via a transmission path 230. In this case, the data transmission is effected wirelessly at least via a subsection 240 of the transmission path 230.

The communication controller 10 has a control unit 100 that controls and organizes the processes of the communication controller. In addition, a connecting interface 110 is present which sets up the connection to the tachograph. A memory 120 can buffer-store data to be transmitted. The power supply interface 130 is used to ensure that the communication controller 10 is supplied with power.

The communication controller accommodates both a WLAN module 140 and a GSM module 150. In this context, the WLAN module 140 is connected to the control unit 100 via a connection 1400. The same applies to the GSM module 150, which is connected to the control unit 100 by means of the connection 1500. The connecting interface 110 communicates with the control unit 100 via the connection 1100. This also covers a CAN interface, for example.

The connecting interface 110 communicates with the tachograph 20 via the connection 1120. In this case, this connection is at least wire-based, but may also be wireless. As an alternative to the embodiment shown in FIG. 1, it is also possible for just one of the two modules 140 or 150 to be arranged in the communication controller. In this case, the module 140 can also use a different transmission standard mentioned in the previous sections. The presence of more than two modules is also possible.

The communication controller 10 can use the WLAN module 140 to transmit data wirelessly via the WLAN connection 1430. The same applies to the GSM module 150, which can use the GSM connection 1530 to communicate with the data processing installation 30.

By way of example, the communication controller 10 may be accommodated in the driver's cab at a location which is easy to reach. It may also have an on/off switch, so that it can be switched on at arbitrary intervals. Furthermore, it may be of portable design.

It is also conceivable for the communication controller 10 to be fully accommodated in the tachograph 20, i.e. for these to share a common housing.

Figure 2:
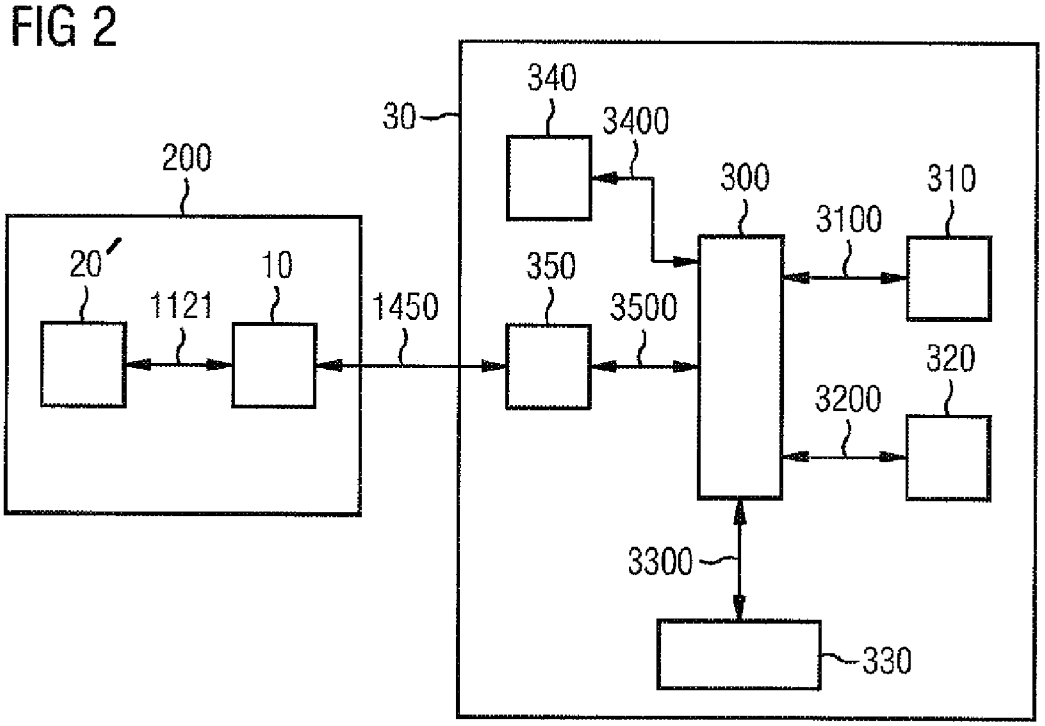
FIG. 2 is a schematic diagram of a system with a data processing installation in a further embodiment.

FIG. 2 is a design of the data processing installation 30 in more detail. The data processing installation 30 communicates with the communication controller 10 and the digital tachograph 20', both the communication controller 10 and the digital tachograph 20' being accommodated in a vehicle 200. The communication controller 10 is connected to the digital tachograph 20' via the connection 1121. The connection 1450 to be set up, which in FIG. 3 is a connection by the GSM module 150, is used to set up a connection between the communication controller 10 and hence between the digital tachograph 20' and the data processing installation 30.

A central element in the data processing installation is the server 300, which is connected to a static PC 310 via a connection 3100. In addition, a web terminal 320 is present which communicates with the server 300 via a connection 3200. An authentication apparatus 330 communicates with the server by an encrypted connection 3300. In this case, the authentication apparatus 330 may be a card reader with a company card associated therewith. There may also be a plurality of authentication apparatuses 330 present, for example if the data processing installation has a plurality of servers at different locations or different sites each have different company cards. The server uses a standard protocol, such as TCP/IP, to communicate with a WLAN access point 340 and a GSM provider network 350 via connections 3400 and 3500. In this case, the connection between the GSM provider network 350 and the server can be set up by an additional COM server. The GSM provider network 350 may also be an external network, which is not directly associated with the operator of the data processing installation, but rather merely sets up the connection between a mobile GSM terminal and the server.

Figure 3:
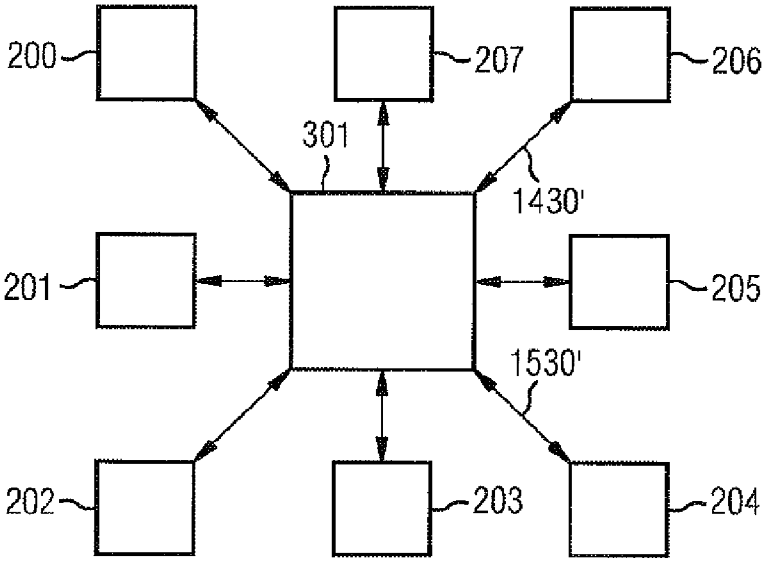
FIG. 3 is a schematic illustration of a system with a plurality of tachographs.

FIG. 3 schematically shows how a data processing installation 301' communicates with a plurality of vehicles 200, 201, 202, 203, 204, 205, 206, 207. In this case, two connections are shown: Thus, at the time shown, the vehicle 206 communicates with the tachograph arranged therein and with the associated communication controller via a WLAN connection 1430'. At the same time, the vehicle 204 uses its associated tachograph unit and the associated communication controller to communicate with the data processing installation 301' via a GSM connection 1530. The data processing installation 301' can perform a plurality of commands simultaneously, so that an improved workflow takes place and the method of data transmission no longer requires manual authentication or manual transportation between the vehicle and the data processing installation. The arrangement of a tachograph and a communication controller in a vehicle can be seen in FIG. 2.

It is easy to see that a vehicle (for example the vehicle 200) has a dedicated tachograph 20' which is used by various drivers, the various drivers in turn being able to work at different times in various vehicles. Manually, the evaluation and input of such crossovers would have a high level of organizational complexity linked to them. The proposed system can provide a rapid overview of both the data from the drivers and the tachographs 20' in this case on account of the high level of automation.

Figure 4A:
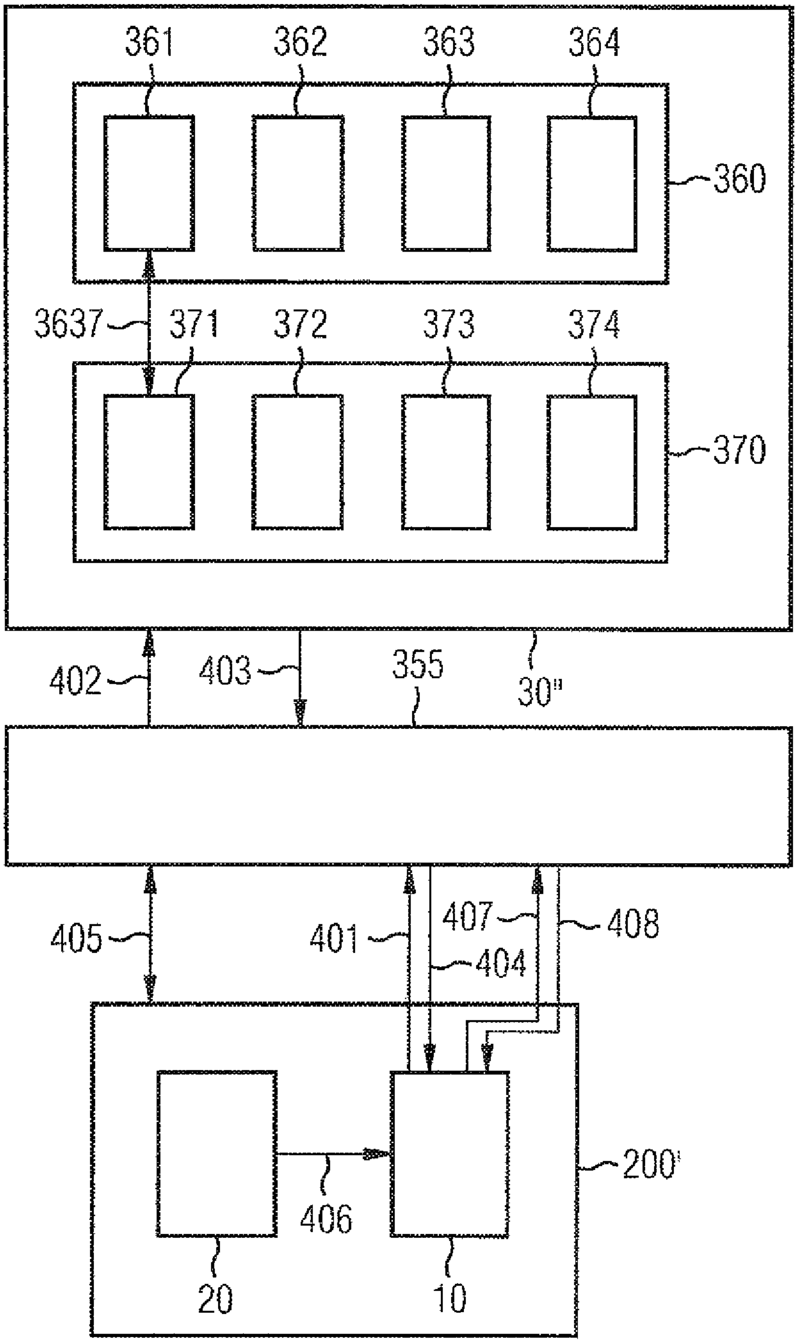
FIG. 4*a,b* are flowcharts for an embodiment of a method.

The method according to the invention will be explained in more detail with reference to FIGS. 4*a* and 4*b*. FIG. 4*a* shows a vehicle 200' with a tachograph 20 arranged therein and a communication controller 10 associated with the tachograph. Furthermore, a data processing installation 30" is present which has an archive 360 and an instruction register 370 including instruction 371-374. In this case, both the archive and the instruction register are present in the form of databases such as SQL databases. The archive 360 has a plurality of information items 361, 362, 363, 364 which are respectively present for each individual tachograph or each individual driver.

Information about the vehicle 200' shown or the tachograph 20 arranged therein is stored in the archive 360 as a plurality of information items 361. The already present information 361 is linked to the associated instructions 371 (see reference symbol 3637). Various information items from different tachographs can result in various instructions.

An embodiment of the method will be explained with reference to an exemplary GSM connection between the communication controller 10 and the data processing installation 30". In the switched-on state, the communication controller 10 performs registration 401 on the GSM network 355, after the data processing installation 30" has transmitted a message, for example a text message, to the communication controller 10. The text message asks the communication controller 10 to set up a connection to the data processing installation 30". Based on the registration 401 and the information 402 transmitted by the GSM network 355 to the data processing installation 30", the data processing installation knows that the vehicle 200' is in the transmission and reception range of a GSM network linked to the data processing installation 30".

The data processing installation 30" then establishes whether instructions 371 are present which require specific data from the tachograph 20 to be transmitted to the data processing installation 30". By way of example, such an instruction could be that the data from the tachograph in HGV No 17, which were recorded between Oct. 10, 2007 and Oct. 19, 2007, need to be downloaded from Oct. 20, 2007. On Oct. 20, 2007, the data processing installation 30" sends a text message to the communication controller in HGV No 17 with the request to register on the system. At the time of the registration 401 is already Oct. 21, 2007, and the data processing installation 30" sends a request 404 to the communication controller 10 for data to be transmitted from the tachograph 20 to the communication controller 10 via the connection 406 and then for the data from the tachograph which is buffer-stored in the communication controller 10 to be transmitted via the connection 407 to the data processing installation 30". Before the data 406 is interchanged between the tachograph 20 and the communication controller 10, authentication 405 needs to take place between the data processing installation 30" and the tachograph 20. Following the authentication, the data is transmitted via a connection 407 to the data processing installation 30" and can be viewed by colleagues using the clients. Date is transmitted from the data processing installation 30" via connection 403, 408.

It may happen that the communication controller 10 registers on the data processing installation 30" and receives the instructions 404 but is then no longer in the reception range of the GSM network 355. For this instance, the data since buffer-stored in the communication controller 10 is not transmitted to the data processing installation 30" until the communication controller next registers on the data processing installation 30". In this case, it is irrelevant whether the connection 407 is a GSM connection or just a WLAN connection.

One example of the software used in the data processing installation is the tachograph information service (TIS) system. The vehicle 200' can transmit data between the tachograph 20 and the data processing installation 30" either on a short-haul link using a WLAN module, or on a long-haul link, using a GSM module, so that outstanding overall coverage of the total fleet of vehicles is ensured.

Figure 4B:
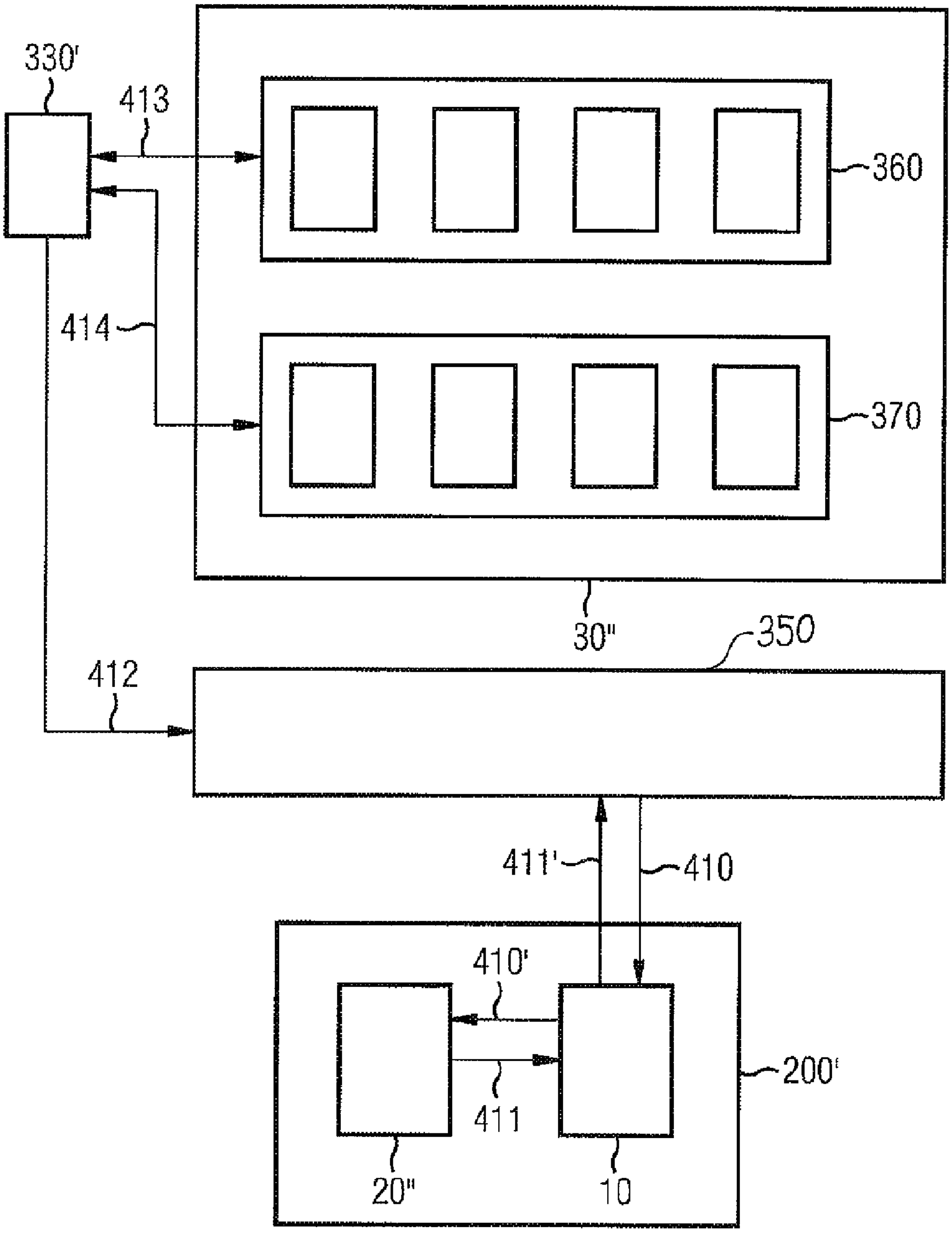

In FIG. 4*b*, the authentication process will again be discussed in brief. In this case, it is necessary firstly to authenticate a company card 330' on the tachograph 20 and secondly to authenticate the tachograph 20" on the data processing installation 30". During these processes, the communication controller 10 is a mediator or broker and transmits usually encrypted data between the data processing installation 30" and the tachograph 20". During the authentication of the tachograph on the data processing installation, the communication controller receives data 411 and transmits these data to a WLAN access point 350. The data are denoted by the reference symbol 411' and are transmitted wirelessly. The company card 330' transmits its authentication 412 to the WLAN access point, and these data are in turn transmitted to the communication controller 10 as data 410. The communication controller 10 in turn transmits this data as data 410' to the tachograph 20". It is possible for the company card 330' to also access information from the archive 360 or the instruction register 370 using the connections 413 and 414.

In the case of the WLAN access point, the data processing installation does not necessarily transmit a text message to the communication controller via the WLAN access point. The communication controller looks for a WLAN access point (or access point based on a different transmission standard) and registers on it if it is found, independently of a notification. However, the communication controller can also be notified by a text message which is received by the GSM module, and can then attempt to set up a connection to a WLAN access point. If this set up fails, an attempt is optionally made to set up a connection via a GSM network.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A communication controller for a transmission of data between a tachograph and a data processing installation via a transmission path that comprises at least one subsection for wireless transmission, the communication controller comprises:

a GSM module for wireless data transmission with the data processing installation;

a module for wireless data transmission with the data processing installation; and a control unit configured to control the communication controller and broker communication between the tachograph and the data processing installation for automated communication between the tachograph and the data processing installation by authenticating a remote authentication apparatus on the tachograph and authenticating the tachograph on the data processing installation.

2. The communication controller as claimed in claim 1, wherein the transmission standard for wireless data transmission is one of:

an IEEE 801.x standard,
a Bluetooth standard,
a wireless USB standard,
a radio wave standard, and
an infrared wave standard.

3. The communication controller as claimed in claim 1, further comprising at least one of:

a connecting interface configured to connect to the tachograph, and a power supply interface configured to provide power to the communication controller.

4. The communication controller as claimed in claim 1, further comprising an additional interface configured for wire-based transmission of data, wherein the additional interface is one of a serial interface and an analog interface.

5. The communication controller as claimed in claim 1, wherein the authentication apparatus is a card.

6. The communication controller as claimed in claim 1, wherein the automated communication between the tachograph and the data processing occurs without the need for manual transmission steps.

7. A system for transmission of data via a transmission path between at least one tachograph and a data processing installation, the system comprises:

the at least one tachograph arranged in a vehicle;

the data processing installation arranged outside of the vehicle;

at least one communication controller, associated with the tachograph, the communication controller comprises:

a GSM module for wireless data transmission with the data processing installation;

a module for wireless data transmission with the data processing installation; and a control unit configured to control the communication controller and broker communication between the tachograph and the data processing installation by authenticating a remote authentication apparatus on the tachograph and authenticating the tachograph on the data processing installation.

8. The system as claimed in claim 7, wherein the data processing installation comprises:

at least one server;

a client configured to access the server; and a communication interface configured for wireless data transmission with the communication controller.

9. The system as claimed in claim 7, wherein for the purpose of authenticating at least one of the tachograph on the data processing installation and the data processing installation on the tachograph, the system function comprises an authentication apparatus coupled to the data processing installation; and a further authentication apparatus coupled to the tachograph.

10. The system as claimed in claim 7, wherein the system comprises a plurality of tachographs and respective communication controllers associated with each of the plural tachographs.

11. A method for transmission of data via a transmission path between at least one tachograph arranged in a vehicle and a data processing installation arranged a distance from the vehicle, wherein the data is transmitted wirelessly via at least a subsection of the transmission path, and at least one communication controller associated with the tachograph has a GSM module and a module for wireless data transmission, the method comprises:

brokering communication between the tachograph and the data processing installation;

registering the at least one communication controller on the data processing installation;

instructing the tachograph by the data processing installation to wirelessly transmit specific data between the at least one communication controller and the data processing installation;

authenticating the at least one tachograph with the data processing installation by authenticating a remote authentication apparatus on the tachograph; and transmitting the specific data from the at least one tachograph via the communication controller to the data processing installation.

12. The method as claimed in claim 11, wherein the data processing installation has a communication interface configured for wireless data transmission with the communication controller.

13. The method as claimed in claim 12, wherein the communication interface comprises a wireless access point and a GSM network access.

14. The method as claimed in one of claim 11, further comprising buffer-storing the data transmitted between the at least one tachograph and the data processing installation in the communication controller.

15. The method as claimed in one of claim 11, wherein the data processing installation contains information about the at least one tachograph, wherein the information comprises at least one time and an instruction to be performed from said time.

16. The method as claimed in claim 15, further comprising a plurality of tachographs, the data processing installation holds information for each of the plural tachographs and communicates with each of the plural tachographs independently of one another.

* * * * *